US005848727A

United States Patent [19]

Leo et al.

[11] Patent Number: 5,848,727

[45] Date of Patent: Dec. 15, 1998

[54] SCENT STRIP DISPENSER

[76] Inventors: Daniel W. Leo, 300 E. 40th St., New York, N.Y. 10016; Thomas E. Peterson, 117 Folsom Ave., Huntington Station, N.Y. 11746

[21] Appl. No.: 730,607

[22] Filed: Oct. 9, 1996

[51] Int. Cl.$^{6}$ .................................................... B65G 59/00

[52] U.S. Cl. ............................................ 221/259; 271/121

[58] Field of Search .................................... 221/277, 259, 221/241, 242, 237, 232, 231, 226, 217, 210; 271/121, 124, 109

[56] References Cited

U.S. PATENT DOCUMENTS 3,640,524 2/1972 Fredrickson ............................ 271/121

5,018,614 5/1991 Ruckert .................................. 221/259

5,335,822 8/1994 Kasper .................................... 221/259

*Primary Examiner*—Kenneth Noland

*Attorney, Agent, or Firm*—Charles E. Temko

[57] ABSTRACT

A manually operated dispensing device for ejecting perfume sampling strips of varying length and thickness. Interchangeable septums are provided to form properly sized stacking channels. A resilient lip prevents more than one sample strip from being ejected during a single activation. A tapered exit opening accommodates the leading edge of strips of varying thickness and possible misalignment.

2 Claims, 2 Drawing Sheets

SCENT STRIP DISPENSER

BACKGROUND OF THE INVENTION

This invention relates generally to the field of serial article dispensing devices, and more particularly to an improved dispenser adapted for ejecting card-like scent strips used for customer sampling of perfumes, colognes, and related scents. Devices for dispensing planar rectangular articles are well-known in the art, and the present invention lies in specific constructional details which adapt the device for handling scent strips of varying thickness and overall rectangular sizes.

Most prior art devices of this general type are constructed to handle a specific article size and include a vertical channel in which a column of such items is stacked. The lower surface of each successive article is placed in frictional contact with a moving belt or plurality of rollers which advances the card through an exit opening where it may be grasped by a user.

Unfortunately, in the field of scent strips, samples are prepared in a variety of rectangular sizes and thickness. Because the paper stock used is both relatively porous and presents a substantially less than glossy surface, the separation of successive samples for serial dispensing presents problems. One problem is the tendency of adjacent samples to stick together, sometimes resulting in the dispensing of more than one sample at a time. On occasion, the total thickness of several strips exceeds the width of the exit opening resulting in failure of the device to eject any sample.

SUMMARY OF THE INVENTION

Briefly stated, the invention contemplates the provision of an improved manually operable dispenser of the class described in which the above-mentioned disadvantages have been substantially eliminated. To this end, the device includes selectively positionable planar septums which adjust the overall size of the channel in which the stack of strips is disposed to maintain them in aligned relation. To provide rapid operation, a pair of geared advancement rollers are arranged to provide continuous contact with the lower surface of a strip until a substantial portion of the same is projected through an exit opening in a housing. A resilient strip separator element bears on the upper surface of the sample being ejected, and is provided with a transversely extending dimple forming a lip which engages the forward edge of a superimposed strip to prevent it from being ejected with the strip engaged by the rollers. The exit opening in the housing includes an opposed pair of surfaces to guide the leading edge of the ejected strip through the exit opening in the event that the same becomes misaligned.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
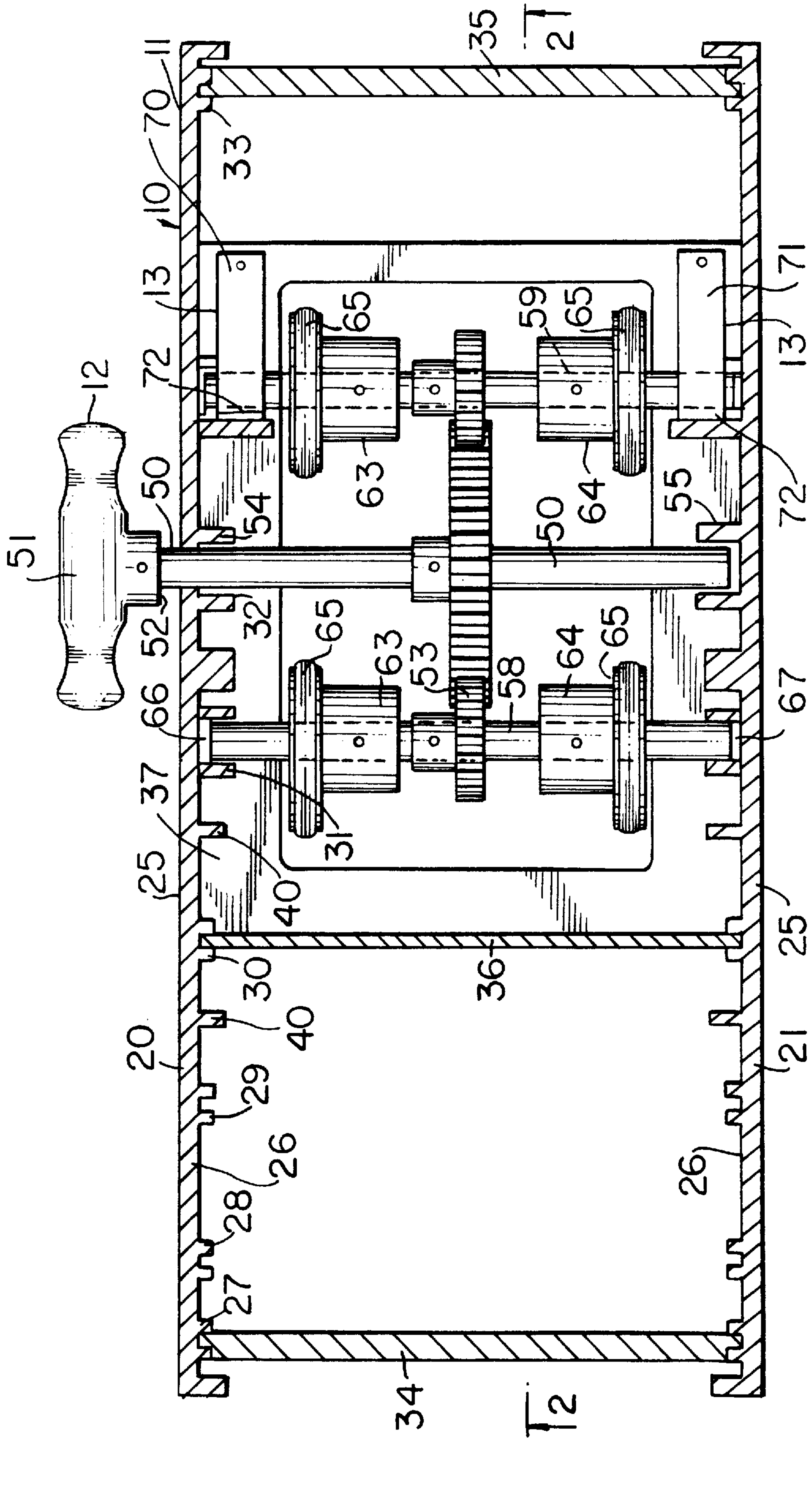
FIG. 1 is a horizontal sectional view of an embodiment of the invention as seen from the plane 1—1 in FIG. 2.

In accordance with the invention, the device, generally indicated by reference character 10, comprises broadly: a casing element 11, a strip advancement element 12, and a resilient strip separator element 13.

The casing element 11 is preferably and most conveniently formed as a synthetic resinous molding operation. It includes first and second longitudinal side walls 20 and 21 each defining an upper horizontal edge 22 and a lower horizontal edge 23. A fixed horizontal wall 24 interconnects the walls 20–21, each of which includes an outer relatively smooth surface 25 and an inner surface 26 having channel forming projections 27, 28, 29, 30, 31, 32, and 33. First and second end walls 34 and 35 are positioned in channels formed by projections 27 and 33, or, if desired, these walls may be integrally molded. A removable septum 36 is positioned selectively with any of the channels formed by projections 28, 29, and 30 to effectively dimensionally limit the length of a channel 37 which retains stacked strips 38 loaded at periodic intervals therein. An optional weight 39 presses the strips 38 downwardly to engage the element 12. A pair of fixed guides 40 serve to align longitudinal or end edges of the strips 38, depending upon their size. While the width of the casing element 11 is not variable, it will be readily understood that strips of smaller size can be positioned with their principal axis transverse to that of the casing element, and larger strips can be positioned with their principal axis substantially coincident therewith.

The strip advancement element 12 includes a manually driven main shaft 50 having a handle 51 at a projecting end 52 thereof. It supports a centrally positioned, relatively large gear 53 and is supported in first and second bearings 54–55 which can be molded integrally with the casing element 11.

Positioned on either side of the shaft 50 are first and second driven shafts 58 and 59 each mounting a pinion 60 and first and second driven rollers 63–64 which include a rubber disk 65 frictionally contacting the lower surface of successive strips. First and second bearings 66 and 67, again, may be integrally molded with the casing element 11.

The strip separator element 13 serves a joint function. It guides the leading edge of each strip toward a slotted opening for ejecting the same. It also serves to disengage an upper strip from a lower strip being ejected where they have frictionally engaged each other, so that only the lower strip will be first ejected, and the upper strip will be subsequently ejected when the device is again actuated. As has been mentioned, this problem occurs with greater frequency than is the case where simple card-like objects are dispensed, owing to the fact that the strips, in order to maintain an impregnated scent, must be of a relatively porous nature, and present outer surfaces which are other than totally smooth. Particularly when the moisture content of the strips is relatively high, there is a tendency for the fibers on the outer surfaces to frictionally engage each other. Additionally, the element 13 provides an initial guiding function to direct each strip toward the exit opening in the casing element.

Figure 2:
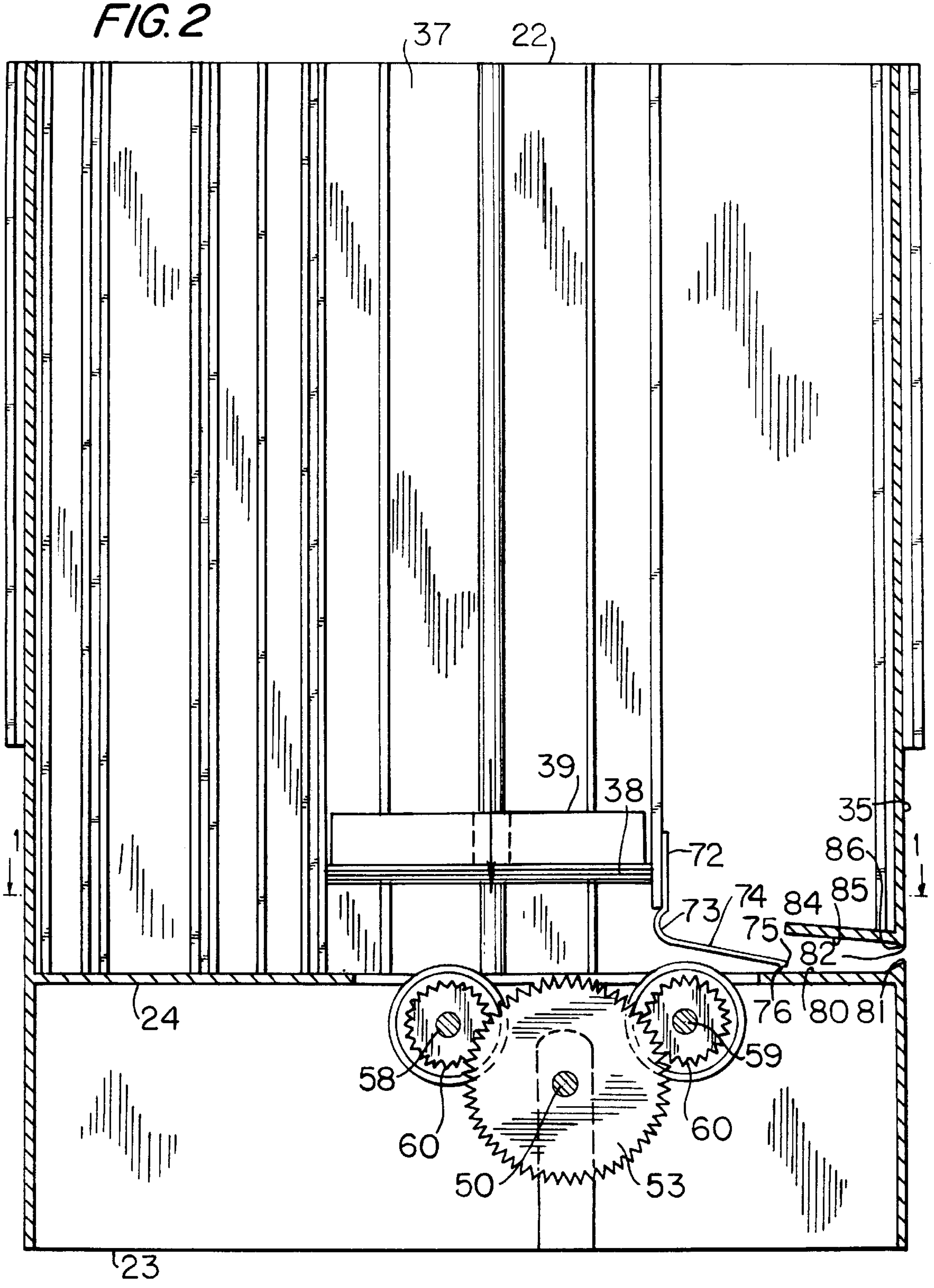
FIG. 2 is a vertical sectional view thereof as seen from the plane 2—2 in FIG. 1.

As best seen in FIG. 2, the element includes first and second resilient spring steel members 70 and 71, each including a mounting terminal 72, an arcuate portion 73, and a relatively flat portion 74. Adjacent a free end 75 thereof is a projecting dimple 76 which is adapted to engage the free edge of the upper of a pair of strips and break the engagement therebetween. Where only a single strip is present, the dimple 76 is deflected along with the flat portion 74 as the strip moves toward the exit opening in the casing element.

The horizontal wall 24 includes an upper inclined surface 80 with a camming portion 81 bordering a horizontally slotted opening 82. A horizontal guide wall 84 includes a lower slopeing surface 85 and a cam portion 86 which provide a similar guiding function.

Operation of the device will be apparent from a consideration of the drawings. Upon the imparting of manual motion to the handle 51, the driven shafts 58 and 59 are rotated in a direction serving to advance the lowermost strip 38 toward the opening 82. Since it is not possible to have a precisely defined opening in the area of the separator element 13, because of varying thicknesses of strips 38, it is possible that more than one strip will be advanced rightwardly as seen in FIG. 2. When this occurs, the leading edge of the upper strip will be engaged by the dimples 76 which impart a retarding motion to the uppermost strip, which will normally be sufficient to disengage the uppermost strip and any intermediate strip that is present. The dimples will retain the strips until the lowermost strip has been dispensed and manually engaged by the user. Where only a single strip is present, the dimples will be readily deflected by the leading edge of that strip as it passes toward the exit opening.

The strips 38 may be of substantial thickness, where required, which thickness is limited only by the vertical width of the slotted opening 82. To accommodate substantial widths, the cam portions 81 and 86 will align the leading edge of such thicker strip so that the same will smoothly exit through the opening 82 without difficulty.

Although not illustrated in the drawing, it is possible to provide the shaft 50 with unidirectional locking means to prevent rotation of the handle 51 in other than proper direction.

I wish it to be understood that I do not consider the invention to be limited to the precise details of structure shown and described in the specification, for obvious modifications will occur to those skilled in the art to which the invention pertains.

I claim:

1. A scent strip dispensing device comprising: a casing element defining a vertically oriented channel, means for adjusting the horizontal cross-sectional area of said channel, said casing defining a horizontally-oriented exit opening at a lower end of said channel; a strip advancement element including a pair of driven shafts, frictional wheels carried by said shafts, and positioned at said lower end of said channel to engage the lower surface of a lowermost strip disposed within said channels; a resilient flexible strip separator element positioned in the area of one of said pair of driven shafts to overlie said frictional wheels carried by said one of said shafts, said separator element having means on a free end thereof for engaging a leading edge of a strip passing therebeneath to impart a releasable retaining action thereon, said separator strip element including a pair of rectilinear spring members disposed outwardly of said friction wheels, said means including a downwardly projecting dimple extending from said spring members.

2. A device in accordance with claim 1, said pair of spring members having free ends positioned adjacent said exit opening in said casing element.

* * * * *